(12) United States Patent  
Kobayashi

(10) Patent No.: US 7,634,090 B2
(45) Date of Patent: Dec. 15, 2009

(54) PACKET BASED HIGH DEFINITION HIGH-BANDWIDTH DIGITAL CONTENT PROTECTION

(75) Inventor: Osamu Kobayashi, Los Altos, CA (US)

(73) Assignee: Genesis Microchip Inc., Santa Clara, CA (US)

(*) Notice: Subject to any disclaimer, the term of this patent is extended or adjusted under 35 U.S.C. 154(b) by 591 days.

(21) Appl. No.: 10/762,680

(22) Filed: Jan. 21, 2004

(65) Prior Publication Data

US 2005/0069130 A1 Mar. 31, 2005

Related U.S. Application Data

(60) Provisional application No. 60/506,193, filed on Sep. 26, 2003.

(51) Int. Cl.
*H04N 7/167* (2006.01)

(52) U.S. Cl. .................................. 380/201; 705/51

(58) Field of Classification Search ............... 380/201, 380/203; 726/1, 26, 27, 30, 31, 32, 33; 725/31; 713/169
See application file for complete search history.

(56) References Cited

U.S. PATENT DOCUMENTS

| | | | |
|---|---|---|---|
| 4,796,203 A | | 1/1989 | Roberts |
| 5,245,612 A | * | 9/1993 | Kachi et al. ............... 370/324 |
| 5,258,983 A | * | 11/1993 | Lane et al. ............... 370/477 |
| 5,369,775 A | * | 11/1994 | Yamasaki et al. ........... 712/25 |
| 5,515,296 A | | 5/1996 | Agarwal |
| 5,541,919 A | | 7/1996 | Yong et al. |
| 5,608,418 A | | 3/1997 | McNally |
| 5,615,376 A | | 3/1997 | Ranganathan |
| 5,629,715 A | | 5/1997 | Zenda |
| 5,739,803 A | | 4/1998 | Neugebauer |
| 5,745,837 A | | 4/1998 | Fuhrmann |
| 5,790,083 A | | 8/1998 | Bassetti |
| 5,805,173 A | | 9/1998 | Glennon et al. |
| 5,838,875 A | | 11/1998 | Cho et al. |
| 5,852,630 A | | 12/1998 | Langberg et al. |
| 5,909,465 A | | 6/1999 | Bottomley et al. |

(Continued)

FOREIGN PATENT DOCUMENTS

CN 1353513 6/2002

(Continued)

OTHER PUBLICATIONS

Examination Report dated Nov. 13, 2006 from related European Patent Application No. 04255609.2.

(Continued)

*Primary Examiner*—Kambiz Zand
*Assistant Examiner*—Dant B Shaifer Harriman
(74) *Attorney, Agent, or Firm*—Beyer Law Group LLP; Lisa K. Jorgenson

(57) ABSTRACT

A packet based high bandwidth copy protection method is described that includes the following operations. Forming a number of data packets at a source device, encrypting selected ones of the data packets based upon a set of encryption values, transmitting the encrypted data packets from the source device to a sink device coupled thereto, decrypting the encrypted data packets based in part upon the encryption values, and accessing the decrypted data packets by the sink device.

19 Claims, 4 Drawing Sheets

U.S. PATENT DOCUMENTS

| | | | |
|---|---|---|---|
| 5,918,002 A | 6/1999 | Klemets et al. | |
| 5,926,155 A | 7/1999 | Arai et al. | |
| 5,940,137 A | 8/1999 | Hulvey | |
| 5,949,437 A | 9/1999 | Clark | |
| 6,005,861 A | 12/1999 | Humpleman | |
| 6,020,901 A | 2/2000 | Lavelle et al. | |
| 6,038,000 A | 3/2000 | Hurst, Jr. | |
| 6,049,316 A | 4/2000 | Nolan et al. | |
| 6,049,769 A | 4/2000 | Holmes et al. | |
| 6,069,929 A | 5/2000 | Yabe et al. | |
| 6,151,334 A | 11/2000 | Kim et al. | |
| 6,151,632 A | 11/2000 | Chadda et al. | |
| 6,154,225 A | 11/2000 | Kou et al. | |
| 6,175,573 B1 | 1/2001 | Togo et al. | |
| 6,177,922 B1 | 1/2001 | Schiefer et al. | |
| 6,219,736 B1 | 4/2001 | Klingman | |
| 6,223,089 B1 | 4/2001 | Page | |
| 6,249,319 B1 | 6/2001 | Post | |
| 6,326,961 B1 | 12/2001 | Lin et al. | |
| 6,337,964 B2 | 1/2002 | Inami et al. | |
| 6,353,594 B1 | 3/2002 | Tooker et al. | |
| 6,356,260 B1 | 3/2002 | Montalbo | |
| 6,437,768 B1 | 8/2002 | Kubota et al. | |
| 6,441,857 B1 | 8/2002 | Wicker et al. | |
| 6,446,130 B1 | 9/2002 | Grapes | |
| 6,477,252 B1 * | 11/2002 | Faber et al. | 380/200 |
| 6,545,688 B1 | 4/2003 | Loveridge et al. | |
| 6,577,303 B2 | 6/2003 | Kim | |
| 6,587,480 B1 | 7/2003 | Higgins et al. | |
| 6,598,161 B1 * | 7/2003 | Kluttz et al. | 713/166 |
| 6,608,828 B1 | 8/2003 | Balachandran | |
| 6,614,800 B1 | 9/2003 | Genty et al. | |
| 6,661,422 B1 | 12/2003 | Valmiki et al. | |
| 6,697,376 B1 | 2/2004 | Son et al. | |
| 6,704,310 B1 | 3/2004 | Zimmermann et al. | |
| 6,765,931 B1 | 7/2004 | Rabenko et al. | |
| 6,865,188 B1 | 3/2005 | Stirling et al. | |
| 6,873,625 B1 | 3/2005 | Yoo et al. | |
| 6,903,716 B2 | 6/2005 | Kawabe et al. | |
| 6,909,442 B2 | 6/2005 | Hiyama et al. | |
| 6,914,637 B1 | 7/2005 | Wolf et al. | |
| 6,963,968 B2 | 11/2005 | Kori | |
| 6,973,069 B1 | 12/2005 | Spear et al. | |
| 6,975,645 B1 | 12/2005 | Suzuki et al. | |
| 7,046,631 B1 | 5/2006 | Giroux et al. | |
| 7,075,987 B2 | 7/2006 | Kim et al. | |
| 7,136,415 B2 | 11/2006 | Yun et al. | |
| 7,177,329 B2 | 2/2007 | Kobayashi et al. | |
| 7,248,590 B1 | 7/2007 | Liu | |
| 7,256,790 B2 | 8/2007 | Valmiki et al. | |
| 7,295,578 B1 | 11/2007 | Lyle et al. | |
| 7,525,975 B2 | 4/2009 | Caspi et al. | |
| 2001/0030649 A1 | 10/2001 | Mamiya et al. | |
| 2001/0036193 A1 | 11/2001 | Kori | |
| 2001/0038387 A1 | 11/2001 | Tomooka et al. | |
| 2002/0007452 A1 * | 1/2002 | Traw et al. | 713/152 |
| 2002/0011996 A1 | 1/2002 | Inoue et al. | |
| 2002/0060676 A1 | 5/2002 | Kim | |
| 2002/0061024 A1 | 5/2002 | Malkemes et al. | |
| 2002/0062394 A1 | 5/2002 | Bunn et al. | |
| 2002/0071055 A1 | 6/2002 | Ooshima et al. | |
| 2002/0071390 A1 | 6/2002 | Reeves et al. | |
| 2002/0075902 A1 | 6/2002 | Abbas et al. | |
| 2002/0085582 A1 | 7/2002 | Kim | |
| 2002/0089517 A1 | 7/2002 | Ludtke et al. | |
| 2002/0122515 A1 | 9/2002 | Bodenschatz | |
| 2002/0136219 A1 | 9/2002 | Ding et al. | |
| 2002/0149617 A1 | 10/2002 | Becker | |
| 2002/0163598 A1 * | 11/2002 | Pasqualino | 348/725 |
| 2002/0164022 A1 * | 11/2002 | Strasser et al. | 380/201 |
| 2002/0190974 A1 | 12/2002 | Morita | |
| 2002/0190978 A1 | 12/2002 | Agarwal et al. | |
| 2003/0035442 A1 | 2/2003 | Eng | |
| 2003/0048852 A1 | 3/2003 | Hwang et al. | |
| 2003/0063077 A1 | 4/2003 | Koyama | |
| 2003/0076282 A1 | 4/2003 | Ikeda et al. | |
| 2003/0080971 A1 | 5/2003 | Hochmuth et al. | |
| 2003/0112822 A1 | 6/2003 | Hong et al. | |
| 2003/0145258 A1 | 7/2003 | Warner et al. | |
| 2003/0149987 A1 | 8/2003 | Pasqualino et al. | |
| 2003/0152160 A1 | 8/2003 | Bauch et al. | |
| 2003/0174156 A1 | 9/2003 | Katsuhara et al. | |
| 2003/0174795 A1 | 9/2003 | Bruhnke et al. | |
| 2003/0212811 A1 | 11/2003 | Thornton | |
| 2004/0049705 A1 | 3/2004 | Liebenow | |
| 2004/0080671 A1 | 4/2004 | Siemens et al. | |
| 2004/0081151 A1 | 4/2004 | Greis et al. | |
| 2004/0088469 A1 | 5/2004 | Levy | |
| 2004/0103333 A1 | 5/2004 | Martwick et al. | |
| 2004/0114607 A1 | 6/2004 | Shay et al. | |
| 2004/0203383 A1 | 10/2004 | Kelton et al. | |
| 2004/0210805 A1 | 10/2004 | Kimelman et al. | |
| 2004/0218598 A1 | 11/2004 | Kobayashi | |
| 2004/0218599 A1 | 11/2004 | Kobayashi | |
| 2004/0218624 A1 | 11/2004 | Kobayashi | |
| 2004/0218625 A1 | 11/2004 | Kobayashi | |
| 2004/0218627 A1 | 11/2004 | Kobayashi | |
| 2004/0221056 A1 | 11/2004 | Kobayashi | |
| 2004/0221312 A1 | 11/2004 | Kobayashi | |
| 2004/0221315 A1 | 11/2004 | Kobayashi | |
| 2004/0228365 A1 | 11/2004 | Kobayashi | |
| 2004/0233181 A1 | 11/2004 | Kobayashi | |
| 2004/0243905 A1 | 12/2004 | Merritt | |
| 2005/0062699 A1 | 3/2005 | Kobayashi | |
| 2005/0062711 A1 | 3/2005 | Kobayashi | |
| 2005/0066085 A1 | 3/2005 | Kobayashi | |
| 2005/0103333 A1 | 5/2005 | Bonutti | |
| 2006/0036788 A1 | 2/2006 | Galang et al. | |
| 2006/0117371 A1 | 6/2006 | Margulis | |
| 2006/0209890 A1 | 9/2006 | MacMullan et al. | |
| 2007/0097885 A1 | 5/2007 | Traversat et al. | |
| 2007/0140298 A1 | 6/2007 | Eng | |
| 2008/0175277 A1 | 7/2008 | Yin et al. | |
| 2008/0284761 A1 | 11/2008 | Knee et al. | |

FOREIGN PATENT DOCUMENTS

| | | | |
|---|---|---|---|
| EP | 0 354 480 A | 2/1990 | |
| EP | 0 385 449 A1 | 9/1990 | |
| EP | 0674441 | * | 3/1995 |
| EP | 0 674 440 A2 | 9/1995 | |
| EP | 0 674 441 A1 | 9/1995 | |
| EP | 0674440 | 9/1995 | |
| EP | 0674441 | 9/1995 | |
| EP | 0674441 A1 * | 9/1995 | |
| EP | 078 8048 | 6/1997 | |
| EP | 1 041 823 A2 | 10/2000 | |
| EP | 1041823 | 10/2000 | |
| EP | 1 069 721 A2 | 1/2001 | |
| EP | 1 089 503 | 4/2001 | |
| EP | 1 154 354 A | 11/2001 | |
| EP | 1 229 690 A | 8/2002 | |
| EP | 1 251 664 A2 | 10/2002 | |
| EP | 1 432 203 | 6/2004 | |
| EP | 1 473 700 | 11/2004 | |
| EP | 1 517 292 A2 | 3/2005 | |
| EP | 1 519 349 A2 | 3/2005 | |
| EP | 1 519 581 A1 | 3/2005 | |
| GB | 2 329 741 A | 3/1999 | |
| JP | 03-153299 | 7/1991 | |
| JP | 10145309 | 5/1998 | |
| JP | 11175045 | 7/1999 | |
| JP | 2001 218082 | 8/2001 | |
| JP | 2001036900 | 9/2001 | |

| | | |
|---|---|---|
| JP | 2002 304168 | 10/2002 |
| SG | 110144 | 4/2005 |
| WO | WO95/00917 | 1/1995 |
| WO | 95/13681 | 5/1995 |
| WO | WO 98/41008 | 9/1998 |
| WO | WO 99/63513 | 12/1999 |
| WO | WO00/20974 | 4/2000 |
| WO | 02/25822 A2 | 3/2002 |
| WO | WO02/25885 | 3/2002 |
| WO | WO02/065746 | 8/2002 |
| WO | WO 03/058376 | 7/2003 |

OTHER PUBLICATIONS

Search Report/Written Opinion mailed Jul. 17, 2006 from related Singapore Patent Application No. 200405336-9.
Bloks, RHJ, "The IEEE-1934 high speed serial bus," Philips Journal of Research, Elsevier, Amsterdam, NL, vol. 50, No. 1, 1996, pp. 209-216, XP004008212 ISSN: 0165-5817.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.
International Search Report dated Jun. 14, 2006 from European Patent Application No. 04252055.1.
Examination Report dated Jul. 5, 2006 from European Patent Application No. 04255611.8.
Examination/Search Report dated Mar. 1, 2006 from related Singapore Patent Application No. 200402057-4.
Examination Report dated Mar. 15, 2006 from European Patent Application No. 04255610.0.
Chang et al., "Digital Visual Interface," Technology Brief, Dell, May 2000.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.
Kasai N et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
International Search Report dated Dec. 16, 2004 from European Patent Application No. 04255786.8.
"CLUT," http://en.wikipedia.org/wiki/CLUT.
"Packet," http://en.wikipedia.org/wiki/Packet.
International Search Report in related Chinese Application No. 200410044503.5 (GENSP105CN) dated Jun. 29, 2007.
Examination Report in corresponding European Application No. 04255786.8 (GENSPO47) dated Jul. 5, 2007.
Office Action mailed Nov. 27, 2007 from U.S. Appl. No. 10/726,794.
Office Action mailed Jul. 9, 2007 from related U.S. Appl. No. 10/726,895.
High-bandwidth Digital Content Protection System, Revision 1.0, Intel Corporation, Feb. 17, 2000.
EPO Exam Report in EP Application No. 04255786.8 dated Jul. 5, 2007.
International Search Report in related Chinese Application No. 200410044503.5 dated Jun. 29, 2007.
Final Rejection mailed Sep. 21, 2007 from U.S. Appl. No. 10/909,103.
Notice of Allowance mailed Sep. 24, 2007 in U.S. Appl. No. 10/726,802.
Supplemental Notice of Allowance mailed Nov. 6, 2007 in U.S. Appl. No. 10/726,802.
Austrian Exam Report dated Apr. 30, 2007 issued in corresponding Singapore Application No. 200405336-9 (GENSP047SG).
Search Report dated Jun. 30, 2006 from Singapore Patent Application No. 200405336-9 (GENSP047SG).
Office Action mailed Dec. 5, 2006 from Application No. 10/726,802 (GENSP014).
Sung et al., "DVI: A standard for the digital monitor interface," Silicon Image, Inc., Cupertino, CA, 1999, 4 pgs.
Eidson et al., "30.2: HDMI: High-Definition Multimedia Interface," Silicon Image, Inc., Sunnyvale, CA, SID 03 Digest, 2003, pp. 1024-1027.
European Search Report dated Mar. 13, 2008 in EP Application No. 04251582.5.
High-Definition Multimedia Interface Specification, Informational Version 1.0, Sep. 4, 2003, 52 pgs.
European Search Report dated Mar. 13, 2008 in EP Application No. 04252056.9.
European Search Report dated Mar. 28, 2008 in EP Application No. 04252054.4.
Silicon Image, "High-bandwidth Digital Content Protection," White Paper, Feb. 2000, retrieved from the Internet at http://www.siliconimage.com/docs/Sil-WP-002-A.pdf.
Chinese Office Action dated Mar. 28, 2008 in Chinese application No. 200410044503.5.
European Search Report dated Mar. 28, 2008 from EP Application No. 04252203.7.
European Search Report dated Mar. 18, 2008 from EP Application No. 04252202.9.
Austrian Search Report dated Mar. 7, 2008 from Singapore Application No. 200401969-1.
Austrian Examination Report dated Mar. 7, 2008 from Singapore Application No. 200401969-1.
European Search Report dated Mar. 28, 2008 from EP Application No. 04252057.7.
European Search Report dated Apr. 3, 2008 from EP Application No. 04252205.2.7.
Office Action dated Apr. 9, 2008 from U.S. Appl. No. 10/909,027.
Office Action dated Mar. 31, 2008 from U.S. Appl. No. 10/726,794.
Notice of Allowance dated Jan. 29, 2008 in U.S. Appl. No. 10/726,802.
Notice of Allowance dated Apr. 25, 2008 from U.S. Appl. No. 10/726,802.
Notice of Allowance dated Mar. 5, 2008 in U.S. Appl. No. 10/909,103.
Office Action dated Jan. 23, 2008 from U.S. Appl. No. 11/747,839.
Office Action mailed Nov. 26, 2007 from U.S. Appl. No. 10/909,027.
Office Action mailed Dec. 28, 2007 from U.S. Appl. No. 10/726,895.
Office Action dated Nov. 2, 2007 from Chinese Patent Application No. 2004100950502.4.
Office Action mailed Jun. 27, 2007 from U.S. Appl. No. 10/726,794.
Chinese Office Action dated Apr. 4, 2008 in Chinese Application No. 200410047784.X.
Search Report dated Jul. 2, 2008 in EP Application No. 08155263.0.
Search Report dated Jun. 30, 2008 in EP Application No. 08155262.2.
Notice of Allowance dated Oct. 1, 2008 in U.S. Appl. No. 10/909,085.
Office Action dated Oct. 16, 2008 in U.S. Appl. No. 10/909,027.
Search Report dated Jul. 21, 2008 from European Patent Application No. 08153724.3.
Office Action dated Jul. 4, 2008 from Chinese Patent Application No. 200410038545.8.
Office Action dated May 23, 2008 from Chinese Patent Application No. 200410071498.7.
Office Action dated Aug. 8, 2008 from Chinese Patent Application No. 200410045686.2.
Office Action dated Aug. 8, 2008 from Chinese Patent Application No. 200410087460.9.
VESA Display Port Standard, Version 1.1, Mar. 19, 2007.
Office Action dated Aug. 6, 2008 from U.S. Appl. No. 10/726,895.
Office Action dated Aug. 19, 2008 from U.S. Appl. No. 10/726,440.
Office Action dated Aug. 29, 2008 from U.S. Appl. No. 11/742,387.
Examination Report dated Jun. 5, 2008 from European Patent Application No. 04252057.7.

Examination Report dated Jun. 5, 2008 from European Patent Application No. 04251581.7.
Examination Report dated Jun. 5, 2008 from European Patent Application No. 04252202.9.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Chinese Office Action dated Jun. 27, 2008 from Chinese Patent Application No. 200410038432.8.
Office Action dated Jun. 27, 2008 from U.S. Appl. No. 10/909,085.
Office Action dated Aug. 1, 2008 in U.S. Appl. No. 10/909,027.
Chinese Office Action dated Jun. 27, 2008 in Chinese Application No. 200410038546.2.
Office Action dated Jun. 24, 2008 from U.S. Appl. No. 10/726,794.
Search Report dated Jul. 10, 2008 from European Patent Application No. 08153726.8.
Office Action dated Jul. 2, 2008 from European Patent Application No. 04252205.2.
Kobayashi, "DisplayPort Technical Overview," http://web.archive.org/web/20060726222849/http://gnss.com/technology/DisplayPort+Technical+Overview+White+Paper.pdf, Jun. 26, 2006.
Office Action dated Apr. 4, 2008 in CN Patent Application No. 200410043419.1.
Office Action dated Sep. 12, 2008 in CN Patent Application No. 200410044503.5.
Office Action dated Oct. 21, 2008 from U.S. Appl. No. 11/747,839.
English Translation of Office Action dated Oct. 31, 2008 from Chinese Patent Application No. 200410095171.3.
Search Report dated Apr. 2, 2009 in EP Application No. 08153454.7.
Office Action dated May 26, 2009 in U.S. Appl. No. 11/742,222.
Office Action dated May 14, 2009 in U.S. Appl. No. 10/726,895.
Office Action dated Apr. 6, 2009 in U.S. Appl. No. 10/909,027.
Office Action dated Apr. 2, 2009 in U.S. Appl. No. 10/726,794.
Office Action dated Mar. 13, 2009 in CN Patent Application No. 200410095171.3.
Office Action dated Mar. 6, 2009 in CN Patent Application No. 200410043419.1.
Office Action dated Mar. 3, 2009 in U.S. Appl. No. 10/726,440.
Universal Serial Bus Specification, Revision 2.0, Apr. 27, 2000, pp. 7, 19, 32-34, 36, 38, 39, 43, 44, 48-51, 58, 66, 67, 72-74, 85, 86, 132, 206-209, 228, 229, 242-244, 269, 270, 278.
Fairhurst, MPEG-2 Transmission, Jan. 2001, pp. 1-9 from Internet at http://www.erg.abdn.ac.uk/research/future-net/digital-video/mpeg2-trans.html.
Office Action dated Jan. 5, 2009 in U.S. Appl. No. 10/726,440.
Notice of Allowance dated Jan. 7, 2009 in U.S. Appl. No. 11/742,387.
Chinese Office Action dated Nov. 28, 2008 in CN Application No. 200410071497.2.
Office Action dated Mar. 4, 2009 in U.S. Appl. No. 10/726,350.

* cited by examiner

PACKET BASED HIGH DEFINITION HIGH-BANDWIDTH DIGITAL CONTENT PROTECTION

CROSS REFERENCE TO RELATED APPLICATIONS

This patent application takes priority under 35 U.S.C. 119 (e) to U.S. Provisional Patent Application No. 60/506,193, filed on Sep. 26, 2003 entitled "PROVIDING HIGH DEFINITION COPY PROTECTION IN A PACKET BASED DATA STREAM" by Kobayashi which is incorporated by reference in its entirety for all purposes.

BACKGROUND OF THE INVENTION

1. Field of the Invention

The invention relates to display devices. More specifically, the invention describes a method and apparatus capable of providing a robust encryption of a audio/video data in a packet based transmission environment.

2. Overview

Protection of proprietary digital content has become an important consideration and more particularly, in high definition (HD), high-bandwidth applications. Especially important for HD, high-bandwidth applications, content protection provides assurances that owners of digitized content are protected from unauthorized use and copying of their proprietary content. A popular high-bandwidth digital-content protection scheme developed by Intel Corporation of Santa Clara Calif. commonly referred to as HDCP has been widely implemented. As currently configured, this particular HDCP protocol is specifically designed for use in Digital Visual Interface (DVI) and High-Definition Multimedia Interface (HDMI) based environments.

In general, HDCP encrypts the transmission of digital content between the video source, or transmitter—such as a PC, DVD player or set-top box—and the digital display, or receiver—such as a monitor, television or projector. In this way, HDCP is designed to prevent copying or recording of digital content thereby protecting the integrity of content as it is being transmitted. For example, as required by the described HDCP protocol, during an authentication phase, the receiver will only be provided with content once it demonstrates knowledge of the authentication keys which the transceiver verifies through computation of a secret value. Furthermore, to prevent eavesdropping and stealing of the data, the transmitter and receiver will generate a shared secret value that is consistently checked throughout the transmission. Once authentication is established, the transmitter encrypts the data and sends it to the receiver for decryption.

The current implementation of the DVI standard requires the use of a set of defined characters based upon a 10 bit transmission protocol. For example, as currently configured, only 460 characters (out of a possible 1024 available) are used by the receiver for data while 4 characters are used as explicit control signals such as hsync and vsync. In this arrangement, any time the receiver receives and recognizes one of the predefined characters representing data, then the received implicitly defines a data enable signal (DE) as being active thereby indicating that the received data is true data. However, whenever one of the 4 control characters is received by the receiver, then an implicit assumption is made that data enable (DE) is inactive.

HDCP protocol uses the status of DE, $H_{sync}$, $V_{sync}$ and another control signal, called CNTL3, to advance its state machine. The DE, $H_{sync}$, and $V_{sync}$ signals are timing signals associated with raster video transmitted in a "streaming" manner. In a streaming transfer, the pixel data is transferred at pixel rate and the ratio of blanking period to data period is preserved. In case of a packet transfer, these timing signals may not be present. Only the pixel data may be transferred in the packet stream, while timing information is communicated in a different way. Therefore, what is required is a way to support high-definition copy protection that is compatible with existing high definition copy protection protocols such as HDCP over a link, or a transmission medium, that operates in a packet transfer mode.

SUMMARY OF THE INVENTION

What is provided, therefore, is a packet-based digital transmission medium and protocol that supports high definition copy protection that is backwards compatible with existing high definition copy protection protocols such as HDCP.

In one embodiment of the invention, a packet based high bandwidth copy protection method is described that includes the following operations. Forming a number of data packets at a source device, encrypting the data packets based upon a set of encryption values, transmitting the encrypted data packets from the source device to a sink device coupled thereto, decrypting the encrypted data packets based in part upon the encryption values, and accessing the decrypted data packets by the sink device.

In another embodiment, a system for providing packet based high bandwidth copy protection to a data stream is disclosed that includes a source unit arranged to provide a number of data packets, a sink unit coupled to the source unit arranged to receive the data packets from the source unit, an encryption unit coupled to the source unit arranged to encrypt the data packets sent from the source unit to the sink unit, a decryption unit coupled to the sink unit arranged to decrypt the encrypted data packets and an encryption/decryption values generator arranged to provide a set of encryption/decryption values used to encrypt and decrypt the appropriate data packets.

In yet another embodiment, computer program product for providing a packet based high bandwidth copy protection is disclosed that includes computer code for forming a number of data packets at a source device, computer code for encrypting the data packets based upon a set of encryption values, computer code for transmitting the encrypted data packets from the source device to a sink device coupled thereto, computer code for decrypting the encrypted data packets based in part upon the encryption values, computer code for accessing the decrypted data packets by the sink device, and computer readable medium for storing the computer code.

DETAILED DESCRIPTION OF SELECTED EMBODIMENTS

Figure 1:
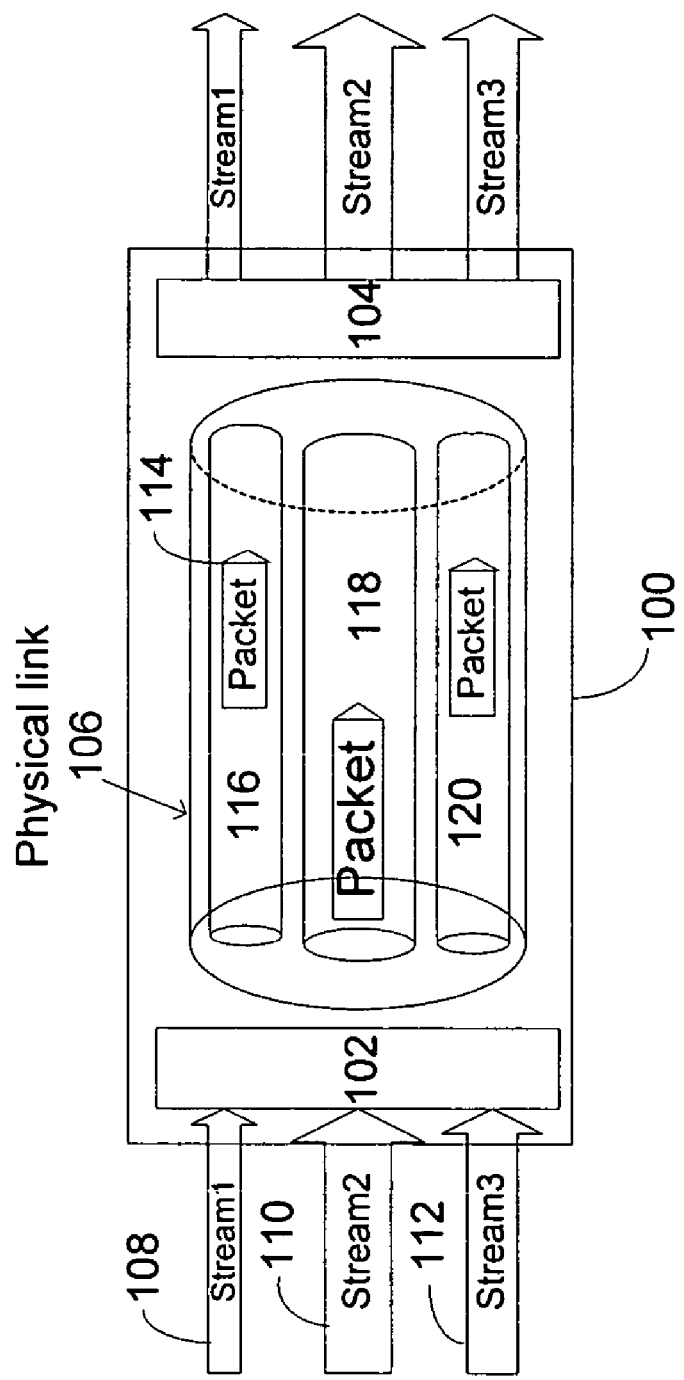
FIG. 1 shows a generalized representation of a cross platform packet based digital video display interface suitable for use with any embodiment of the invention.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

As currently implemented, HDCP establishes a secure channel in order to verify that the display device is licensed to receive protected content and once established, encrypts the data at the host side and decrypts at the display device in order to prevent 'eavesdropping' of the protected content. In addition, in order to identify unauthorized or comprised devices, HDCP relies upon authentication and key exchange, content encryption, and device renewability.

More specifically, HDCP protects copyrighted digital entertainment content in a Digital Video Interface (DVI) environment by encrypting its transmission between the video source and the digital display (receiver). The video source might be a PC, set-top boxes, DVD players and the like), and the digital display might be an liquid crystal display (LCD), television, plasma panel, or projector in which all authorized devices are given a set of unique secret device keys. During an authentication process, the receiver must demonstrate its knowledge of a number of secret device keys before the protected content is sent. After the receiver acknowledges the keys, both devices (the sender and receiver) generate a shared secret value that is designed to prevent eavesdroppers from stealing the content. After authentication, the content is encrypted and sent to the receiver that in turn decrypts it.

Authentication is a cryptographic process for verifying that the display device is authorized (or licensed) to receive protected content. Both the authorized host and the display device have knowledge of a set of secret keys that consist of an array of forty 56-bit secret device keys and a corresponding 40-bit binary Key Selection Vector (KSV). The host initiates authentication by sending an initiation message containing its Key Selection Vector, AKSV, and a 64-bit value An. The display device responds by sending a response message containing its Key Selection Vector, BKSV. The host confirms that the received KSV has not been revoked. At this point, the two devices can calculate a shared value, which, if both devices have a valid set of keys, will be equal. This shared value will be used in the encryption and decryption of the protected content since authentication has now been established.

Re-authentication continues at a rate of approximately once every two seconds to confirm the continued security of the link. If, at any time, equality of the shared value is lost, for example by disconnecting the display device and/or connecting an illegal recording device, the host will consider the DVI link to be unauthenticated, and end the transmission of protected content.

Content is encrypted at the source device to prevent usable, unauthorized copies of the transmitted content from being made. Encryption is the application of an algorithm, called a cipher, that transforms the content. To recover the content, the display device decrypts the content by knowledge of the correct decryption key. The HDCP cipher is a hybrid block/stream cipher. The block cipher operates during the authentication protocol. For content encryption and decryption, HDCP uses a stream cipher where encryption is accomplished by combining a data stream, generated by the HDCP cipher, with the transmitted content, through a bitwise exclusive-OR operation. In this way the content is protected pixel-by-pixel. Encrypted content viewed on a display device without decryption is seen as random noise, with no discernable content. As noted above, currently available HDCP protocols must be implemented using a DVI type connector.

The present invention provides a high definition high bandwidth copy protection protocol suitable for use in a packet based transmission medium that provides a robust digital copyright protection protocol that supports high definition copy protection that is backwards compatible with existing high definition copy protection protocols. In one embodiment of the invention the inventive HDCP protocol is carried out as a packet based high bandwidth copy protection method that includes forming a number of data packets at a source device, encrypting selected ones of the data packets based upon a set of encryption values, transmitting the encrypted data packets from the source device to a sink device coupled thereto, decrypting the encrypted data packets based in part upon the encryption values, and accessing the decrypted data packets by the sink device.

A particularly well suited packet based transmission system is described with reference to FIG. 1 that shows a generalized representation of a cross platform packet based digital video display interface 100 suitable for use with any embodiment of the invention. The interface 100 connects a transmitter 102 to a receiver 104 by way of a physical link 106 (also referred to as a pipe). In the described embodiment, a number of data streams 108-112 are received at the transmitter 102 that, if necessary, packetizes each into a corresponding number of data packets 114. These data packets are then formed into corresponding data streams each of which are passed by way of an associated virtual pipe 116-120 to the receiver 104. It should be noted that the data streams 108-112 can take any number of forms such as video, graphic, audio, etc.

Typically, when the source is a video source, the data streams 108-112 include various video signals that can have any number and type of well-known formats, such as composite video, serial digital, parallel digital, RGB, or consumer digital video. The video signal can be an analog video signal provided the source 102 includes some form of an analog video source such as for example, an analog television, still camera, analog VCR, DVD player, camcorder, laser disk player, TV tuner, set top box (with satellite DSS or cable signal) and the like. The source 102 can also include a digital image source such as for example a digital television (DTV), digital still camera, and the like. The digital video signal can be any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video.

In the case where the source 102 provides an analog image signal, an analog-to-digital converter (A/D) converts an analog voltage or current signal into a discrete series of digitally encoded numbers (signal) forming in the process an appropriate digital image data word suitable for digital processing. Any of a wide variety of A/D converters can be used. By way of example, other A/D converters include, for example those manufactured by: Philips, Texas Instrument, Analog Devices, Brooktree, and others.

For example, if the data stream 110 is an analog type signal, the an analog to digital converter (not shown) included in or coupled to the transmitter 102 will digitize the analog data which is then packetize by a packetizer that converts the digitized data stream 110 into a number of data packets 114 each of which will be transmitted to the receiver 104 by way of the virtual link 116. The receiver 104 will then reconstitute the data stream 110 by appropriately recombining the data packets 114 into their original format. It is these data streams that are ultimately encrypted for form a set of copy protected data streams.

Figure 2:
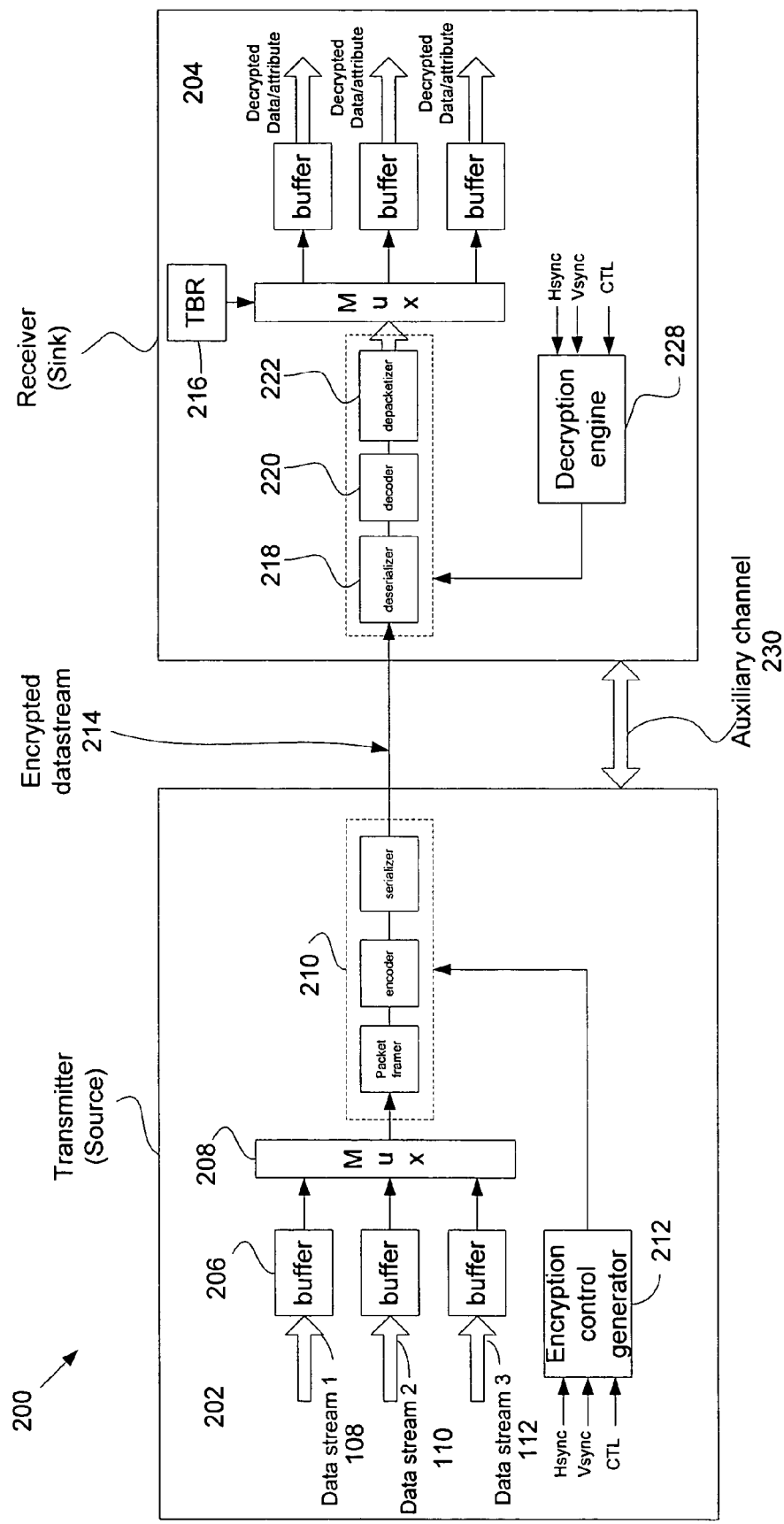
FIG. 2 shows an encryption system for encrypting audio/video content suitable for use with the system described with respect to FIG. 1.

FIG. 2 shows an encryption system 200 for encrypting audio/video content suitable for use with the system 100 described with respect to FIG. 1. As shown in FIG. 2, a video source 202 is arranged to provide a number of data streams such as the datastreams 110 and 112. By utilizing a number of data streams, the system 200 is capable of transmitting video data, for example, consistent with any of a number of video formats concurrently. For example, the data stream 110 is formed of video data consistent with 1024×768 at 60 Hz whereas the datastream 112 is formed of video data consistent with 640×480 at 75 Hz, and so on. In order for a receiver 204 (such as a monitor) to reconstruct the video in the appropriate format, the datastreams include in addition the appropriate video data associated attribute data that is used by the receiver to reconstruct the video in the appropriate format.

Accordingly, the video source 202 includes a number of buffers 206 each of which is used to buffer an associated one of the video datastreams. Each of the buffers is, in turn, coupled to a multiplexer 208 that is used to select a particular one of the data streams for transmission to a packetizer 210. The packetizer 210 parses the incident data stream into an associated number of data packets by incorporating a packet ID, optionally performing error correction, and attaching a time stamp and any of the attributes deemed important or necessary for the correct reconstruction of the video raster by the receiver 204. An encryption control generator unit 212 applies an appropriate encryption algorithm to each of the data packets based at least by inserting a control packet that conveys signals such as $H_{sync}$, $V_{sync}$, and a particular control character CNTL3 used to flag those data packets that are encrypted (and conversely those data packets that are not encrypted).

Figure 3:
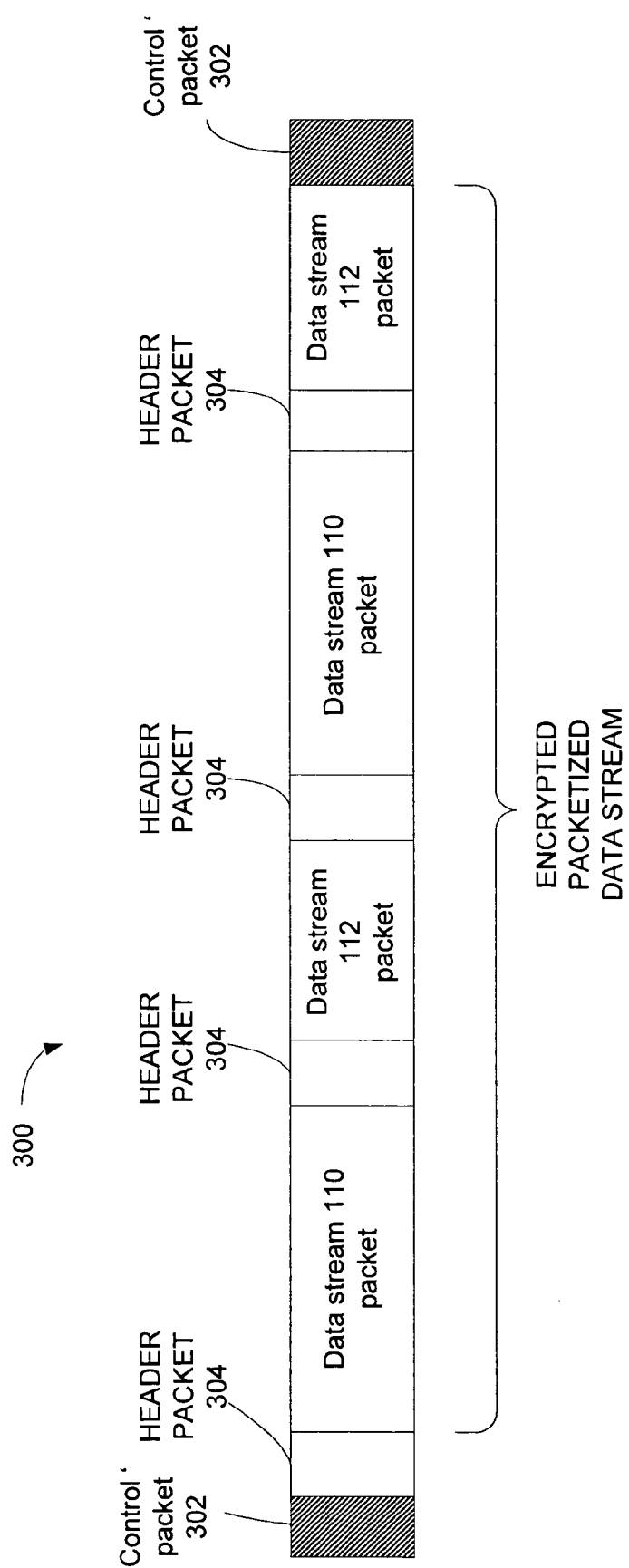
FIG. 3 shows a representative encrypted data stream in accordance with an embodiment of the invention.

In accordance with an embodiment of the invention, the resulting encrypted data stream 214 (a particular example of which is shown in FIG. 3 as a datastream 300) is formed of a number of data packets. The data stream 300 includes a number of control packets 302 used to mark those video data packets that are encrypted (or not encrypted) as the case may be. Each video packet has an associated header 304 that includes, in part, the attribute data described above associated with the corresponding video data packet. For example, in the case shown in FIG. 3, the data stream 300 includes data packets for the datastream 110 and the datastream 112 conjoined into the data stream 300 such that the traffic between the video source 202 and the receiver 204 is consistent with a constant link environment.

It should be noted that in the described embodiment, the data stream 300 is time domain multiplexed, those data packets associated with the datastream 110 have a longer duration than those associated with the data stream 112. In these cases, a time-base recovery (TBR) unit 216 within the receiver 204 regenerates the stream's original native rate using time stamps embedded in the main link data packets, if necessary. Referring back to FIG. 2, at the receiver 204, a deserializer unit 218 receives the encrypted datastream 300 that provides input to a decoder unit 220 and a depacketizer 222. The decoder 220 decodes the control packet, thus feeding $H_{sync}$, $V_{sync}$, and a particular control character CNTL3 provided to a decryption engine 228 that was previously used to for encryption.

Figure 4:
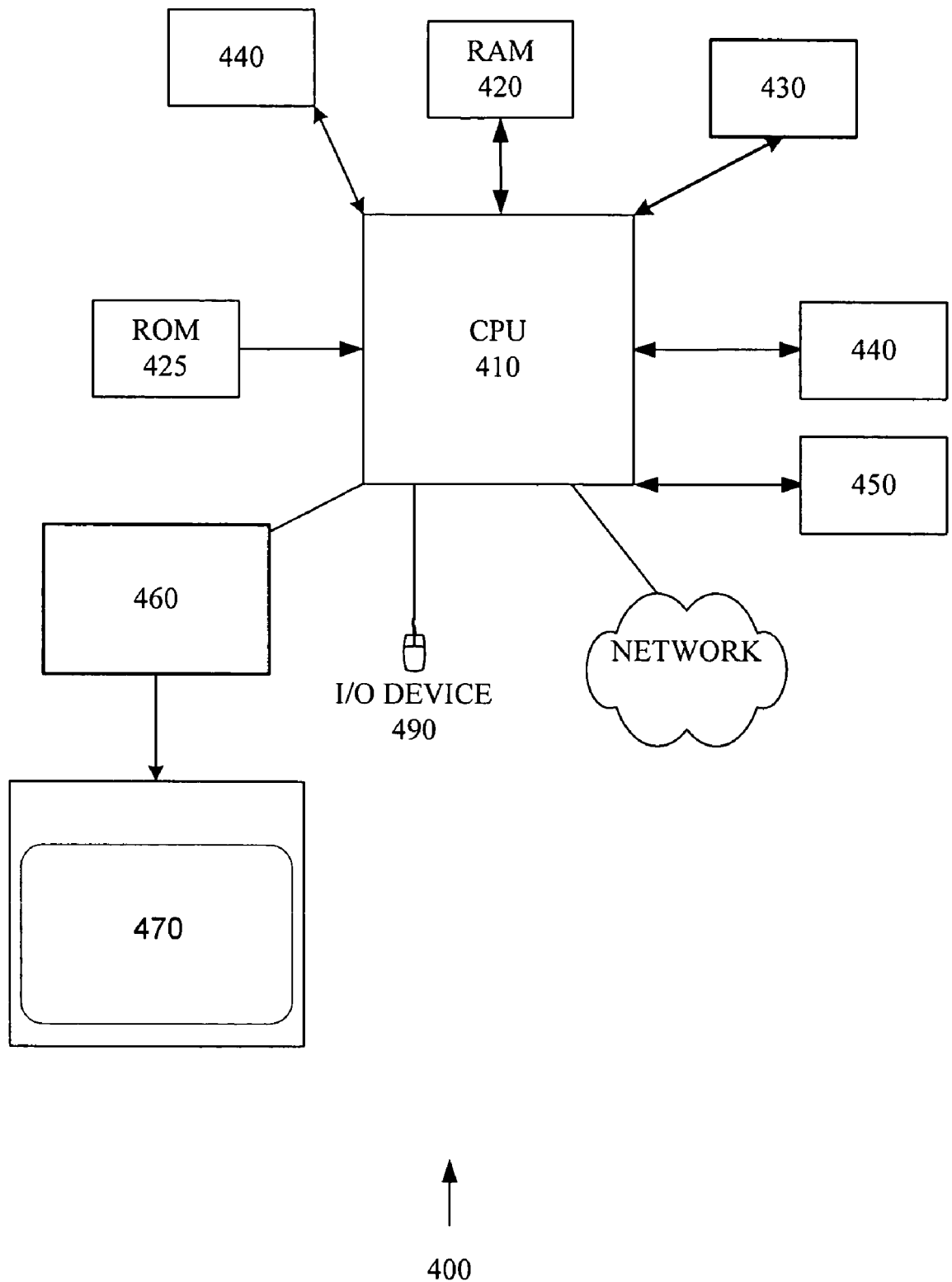
FIG. 4 illustrates a system employed to implement the invention.

FIG. 4 illustrates a system 400 employed to implement the invention. System 400 is only an example of a graphics system in which the present invention can be implemented. System 400 includes central processing unit (CPU) 410, random access memory (RAM) 420, read only memory (ROM) 425, one or more peripherals 430, graphics controller 460, primary storage devices 440 and 450, and digital display unit 470. CPUs 410 are also coupled to one or more input/output devices 490 that may include, but are not limited to, devices such as, track balls, mice, keyboards, microphones, touch-sensitive displays, transducer card readers, magnetic or paper tape readers, tablets, styluses, voice or handwriting recognizers, or other well-known input devices such as, of course, other computers. Graphics controller 460 generates analog image data and a corresponding reference signal, and provides both to digital display unit 470. The analog image data can be generated, for example, based on pixel data received from CPU 410 or from an external encode (not shown). In one embodiment, the analog image data is provided in RGB format and the reference signal includes the $V_{SYNC}$ and $H_{SYNC}$ signals well known in the art. However, it should be understood that the present invention can be implemented with analog image, data and/or reference signals in other formats. For example, analog image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A packet based high bandwidth copy protection method comprising:

forming a number of related data packets at a source device;

forming a first group of encrypted data packets by encrypting some of the data packets based upon a first set of encryption values, wherein the number of encrypted data packets in the first group of encrypted data packets is less than the number of data packets formed at the source device;

forming a second group of encrypted data packets by encrypting those data packets not already encrypted based upon a second set of encryption values, wherein each and every one of the related data packets is encrypted and belongs to either the first or the second group of encrypted data packets;

transmitting the encrypted data packets from the source device to a sink device coupled thereto;

decrypting the first group of encrypted data packets using a first set of decryption values corresponding to the first set of encryption values;

decrypting the second group of encrypted data packets using a second set of decryption values corresponding to the at least second set of encryption values concurrently with the decrypting of the first set of encrypted data packets; and displaying the decrypted data packets by the sink device.

2. A method as recited in claim 1, wherein the source device is a video source and wherein the sink device is a video display and wherein the number of data packets include some audio data packets and some video data packets.

3. A method as recited in claim 1, further comprising:

forming a first control data packet associated with the first set of encryption/decryption values;

using the first control data packet to identify the first group of encrypted data packets, forming a second control data packet associated with the second set of encryption/decryption values; and using the second control data packet to identify the second group of encrypted data packets, wherein the encryption/decryption values include a Vsync control value, an Hsync control value, and a CNTL3 control value.

4. A method as recited in claim 3, using the first set of encryption/decryption values included in the first control data packet to decrypt the first group of encrypted data packets and using the second set of encryption/decryption values included in the second control data packet to decrypt the second group of encrypted data packets.

5. A method as recited in claim 4, wherein when the CNTL3 control value is active, then the corresponding data packet is encrypted.

6. A system for providing high bandwidth copy protection in a packet based system, comprising:

a source unit arranged to provide a number of related data packets;

a sink unit coupled to the source unit arranged to receive the data packets from the source unit;

an encryption unit coupled to the source unit arranged to encrypt selected ones of the data packets sent from the source unit to the sink unit using a first set of encryption values and the remaining data packets using at least a second set of encryption values different from the set of encryption values, wherein each and every one the data packets is encrypted;

a decryption unit coupled to the sink unit arranged to appropriately decrypt the encrypted data packets;

an encryption/decryption values generator arranged to provide the first and at least the second set of encryption/decryption values to the decryption unit; and a processor for processing the decrypted data packets for display by the sink unit.

7. A system as recited in claim 6, wherein the source unit is a video source and wherein the sink device is a video display and wherein the number of data packets include some audio data packets and some video data packets.

8. A system as recited in claim 7, wherein the sink unit is a display unit arranged to display processed ones of the video data packets.

9. A system as recited in claim 8, wherein the display unit includes a number of speakers arranged to transmit audio signals based upon processed ones of the audio data packets.

10. A system as recited in claim 9, wherein the encryption/decryption values include Vsynch, control signal, a Hsynch control signal corresponding to the video data packets.

11. A system as recited in claim 10, wherein the encryption/decryption values further includes s CNTL3 control to flag those data packets that are encrypted.

12. Computer program product executable by a processor for providing a packet based high bandwidth copy protection, the computer program product comprising:

computer code for forming a number of related data packets at a source device;

computer code for forming a first group of the data packets by encrypting some of the data packets based upon a first set of encryption values, wherein the number of encrypted data packets in the first group is less than the number of data packets formed at the source device;

computer code for forming a second group of encrypted data packets by encrypting those data packets not already encrypted based upon a second set of encryption values, wherein each and every one of the related data packets is encrypted and belongs to either the first or the second group of encrypted data packets;

computer code for transmitting the encrypted data packets from the source device to a sink device coupled thereto;

computer code for decrypting the first group of encrypted data packets using a first set of decryption values corresponding to the first set of encryption values;

computer code for decrypting the second group of encrypted data packets using a second set of decryption values corresponding to the at least second set of encryption values concurrently with the decrypting of the first set of encrypted data packets;

computer code for displaying the decrypted data packets by the sink device; and computer readable medium for storing the computer code.

13. Computer program product as recited in claim 12, wherein the source device is a video source and wherein the sink device is a video display and wherein the number of data packets include some audio data packets and some video data packets.

14. Computer program product as recited in claim 13, wherein the encryption control values include a Vsync control value, an Hsync control value, and a CNTL3 control value.

15. Computer program product as recited in claim 14, wherein each of the data packets is associated with an specific CNTL3 control value.

16. Computer program product as recited in claim 15, wherein when the CNTL3 control value is active, then the corresponding data packet is encrypted.

17. A method as recited in claim 1, wherein the first set of encryption values is different than the second set of encryption values.

18. A method as recited in claim 1, using the encryption/decryption values included in the first control data packet to decrypt the first group of encrypted data packets and using the encryption/decryption values included in the second control data packet to decrypt at least the second group of encrypted data packets.

19. A computer chip configured to:

form a number of related data packets at a source device, wherein the related data packets represent a video signal;

form a first group of encrypted data packets by encrypting some of the data packets based upon a first set of encryption values, wherein the number of encrypted data packets in the first group of encrypted data packets is less than the number of data packets formed at the source device, and wherein the first group of encrypted data packets represents the video signal encoded at a first resolution;

form a second group of encrypted data packets by encrypting those data packets not already encrypted based upon a second set of encryption values, wherein each and every one of the related data packets is encrypted and belongs to either the first or the second group of encrypted data packets, and wherein the second group of encrypted data packets represents the video signal encoded at a second resolution;

transmit the encrypted data packets from the source device to a sink device coupled thereto;

decrypt the first group of encrypted data packets using a first set of decryption values corresponding to the first set of encryption values;

decrypt the second group of encrypted data packets using a second set of decryption values corresponding to the at least second set of encryption values concurrently with the decrypting of the first set of encrypted data packets; and display the decrypted data packets by the sink device.

* * * * *

UNITED STATES PATENT AND TRADEMARK OFFICE
CERTIFICATE OF CORRECTION

PATENT NO. : 7,634,090 B2  
APPLICATION NO. : 10/762680  
DATED : December 15, 2009  
INVENTOR(S) : Osamu Kobayashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Ninth Day of November, 2010

David J. Kappos  
*Director of the United States Patent and Trademark Office*